US010555188B2

(12) United States Patent
Yang et al.

(10) Patent No.: US 10,555,188 B2
(45) Date of Patent: Feb. 4, 2020

(54) METHODS, DEVICES, AND SYSTEM FOR MANAGING WIRELESS CONNECTION OF WIFI MOBILE DEVICES

(71) Applicant: Alcatel Lucent, Boulogne-Billancourt (FR)

(72) Inventors: Shuigen Yang, Shanghai (CN); Fanxiang Bin, Shanghai (CN); Haibo Wen, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 752 days.

(21) Appl. No.: 14/786,096

(22) PCT Filed: Apr. 22, 2014

(86) PCT No.: PCT/IB2014/000806
§ 371 (c)(1),
(2) Date: Oct. 21, 2015

(87) PCT Pub. No.: WO2014/184650
PCT Pub. Date: Nov. 20, 2014

(65) Prior Publication Data
US 2016/0081124 A1     Mar. 17, 2016

(30) Foreign Application Priority Data

May 17, 2013   (CN) .......................... 2013 1 0183336

(51) Int. Cl.
*H04W 24/02*  (2009.01)
*H04W 36/00*  (2009.01)
(Continued)

(52) U.S. Cl.
CPC ........... *H04W 24/02* (2013.01); *H04W 48/14* (2013.01); *H04W 48/16* (2013.01); *H04W 52/02* (2013.01);
(Continued)

(58) Field of Classification Search
CPC ..... H04W 76/02; H04W 24/02; H04W 48/14; H04W 48/16; H04W 48/20; H04W 52/02;
(Continued)

(56) References Cited

U.S. PATENT DOCUMENTS 7,907,557 B2 *   3/2011   Carter .................... H04L 12/12
                                                      370/311
8,488,501 B2 *   7/2013   Navda ............... H04W 52/0229
                                                      370/311
(Continued)

FOREIGN PATENT DOCUMENTS

CN        101056177 A      10/2007
CN        101895990 A      11/2010
(Continued)

OTHER PUBLICATIONS

Eric Rozner et al. NAPman: Network-Assisted Power Management for WiFi Devices, NAPman Network, 2010, 1-15.*
(Continued)

*Primary Examiner* — Edan Orgad
*Assistant Examiner* — Vanneilian Lalchinthang
(74) *Attorney, Agent, or Firm* — Harness, Dickey & Pierce, P.L.C.

(57) ABSTRACT

A connection controlling device obtains access-related information of the virtual access points based on one or more wireless connection requests from WiFi mobile devices, forwarded by an access point device, for virtual access points of the access point device, and determines scheduling information corresponding to the wireless connection request based on the access-related information; the virtual access points in the access point device perform corresponding scheduling based on the scheduling information.

12 Claims, 5 Drawing Sheets

(51) Int. Cl.
*G08C 17/00* (2006.01)
*H04W 48/14* (2009.01)
*H04W 48/16* (2009.01)
*H04W 52/02* (2009.01)
*H04W 64/00* (2009.01)
*H04W 72/12* (2009.01)
*H04W 84/12* (2009.01)

(52) U.S. Cl.
CPC ....... *H04W 64/00* (2013.01); *H04W 72/1205* (2013.01); *H04W 84/12* (2013.01)

(58) Field of Classification Search
CPC . H04W 64/00; H04W 72/1205; H04W 76/10; H04W 48/12; H04W 24/08; H04W 28/08; H04W 88/08; Y02D 70/142
USPC .......................................................... 370/329
See application file for complete search history.

(56) References Cited

U.S. PATENT DOCUMENTS

| | | | | | |
|---|---|---|---|---|---|
| 8,553,662 | B2* | 10/2013 | Chen | ...................... | H04W 12/08 370/338 |
| 8,555,364 | B2* | 10/2013 | Filippi | ................ | H04L 63/0272 380/270 |
| 8,693,380 | B2* | 4/2014 | He | ........................ | H04W 52/00 370/311 |
| 8,797,930 | B2* | 8/2014 | Wentink | ............ | H04W 52/0235 370/311 |
| 8,824,378 | B2* | 9/2014 | Wentink | ............ | H04W 52/0235 370/329 |
| 8,964,619 | B2* | 2/2015 | Navda | ............... | H04W 52/0229 370/311 |
| 2009/0141685 | A1* | 6/2009 | Berglund | .......... | H04W 36/0055 370/331 |
| 2009/0316585 | A1* | 12/2009 | Srinivasan | ............ | H04W 24/02 370/241 |
| 2010/0195548 | A1* | 8/2010 | Navda | ............... | H04W 52/0229 370/311 |
| 2016/0037443 | A1* | 2/2016 | Kim | .................. | H04W 52/0229 455/438 |

FOREIGN PATENT DOCUMENTS

| | | |
|---|---|---|
| CN | 101931954 A | 12/2010 |
| JP | 2007028233 A | 2/2007 |
| JP | 2013507039 A | 2/2013 |
| JP | 2013070273 A | 4/2013 |

OTHER PUBLICATIONS

Bernard Ababa, Virtual Access Points, Microsoft, May 22, 2003, 1-13.

Ranveer Chandra et al. A Location-Based Management System for Enterprise Wireless LANs, USENIX Association, Apr. 11, 2013, 115-130.

Japanese Office Action dated Nov. 20, 2017 in related Japanese Application No. 2016-513456, with English translation.

* cited by examiner

METHODS, DEVICES, AND SYSTEM FOR MANAGING WIRELESS CONNECTION OF WIFI MOBILE DEVICES

CROSS-REFERENCE TO RELATED APPLICATIONS

This is a National Phase of PCT/IB2014/000806,filed on Apr. 22, 2014 and claims priority under U.S.C. § 119 to, and further claims priority to Chinese Application No. 201,310, 183,336.1, filed on May 17, 2013, the entire contents of each of which are hereby incorporated by reference.

FIELD OF THE INVENTION

The present invention relates to the field of wireless communication, and in particular to the technology for managing wireless connection of WiFi mobile devices.

BACKGROUND OF THE INVENTION

The fast increasing demand for wireless access to the Internet applications is fuelled by the remarkable growth of WiFi mobile devices, e.g., the smart-phones embedded with WiFi interfaces. However, the WiFi mobile devices typically consume lots of energy, e.g., the WiFi radio consumes about 1000 mW while transmitting/receiving data packets. Since the battery technology has not been developing fast enough to satisfy the demands, it is highly desirable to improve the energy efficiency or optimize the power consumption of wireless data communications on WiFi mobile devices for maximizing the battery life. Here, the WiFi mobile devices are mobile devices supporting wireless connection via WiFi.

Many WiFi mobile devices introduce Power Save Modes (PSM) to save power consumptions when there are no data packets transmitting/receiving. However, if multiple PSM clients connect to the same Access Point (AP) and wake up at the same time for the beacon to check for the presence of any buffered data packets with the same beacon interval at the AP, the data packets destined for different PSM clients will get queued in the AP's transmission queue resulting in longer waiting times for some of the PSM clients to retrieve the data packets.

In order to minimize the power consumption on WiFi mobile devices, most of existing solutions implement different scheduling strategies when a PSM client wakes up and notifies its AP.

Normal scheduling: queues all buffered data packets of a PSM client to the tail of the transmit queue. It increases the time PSM clients remain in the high power consumption Constantly Awake Mode (CAM), wasting energy.

High priority scheduling: queues the buffered data packets of a PSM client to a higher priority queue. While it helps reducing power consumption when the PSM client is competing with other CAM clients, it results in significant unfairness to the other CAM clients.

Additionally, since the scheduling mechanism cannot isolate PSM client(s) from other PSM clients, when an AP serves a certain PSM client, other PSM clients still need to keep an awakened state, which causes power consumption of the clients.

For example, comparing a case in which an AP serves four PSM clients and a case in which the AP serves one PSM client, in a common scheduling, the PSM clients triples the power consumption, while in a high priority scheduling, the PSM clients only increases 45% of the power consumption.

SUMMARY OF THE INVENTION

An object of the invention is providing methods, devices and a system for managing wireless connection of WiFi mobile devices.

According to one aspect of the invention, a method for managing wireless connection of WiFi mobile devices in a connection controlling device is provided, wherein the method comprises the following steps:

a. obtaining one or more wireless connection requests from WiFi mobile devices, forwarded by an access point device, for virtual access points of the access point device, wherein the wireless connection requests include beacon information of the corresponding virtual access point;

b. obtaining access-related information of the virtual access point based on the wireless connection request;

c. determining scheduling information corresponding to the wireless connection request based on the access-related information, wherein the scheduling information includes a target virtual access point corresponding to the WiFi mobile device in the one or more virtual access points; and d. providing the scheduling information to the access point device.

According to another aspect of the invention, a method for managing subsidiarily wireless connection of WiFi mobile devices in an access point device is further provided, wherein the method comprises the following steps:

x. virtualizing physical resources on an access point device, to obtain a plurality of virtual access points that are independent one another;

broadcasting beacon information corresponding to the virtual access points within an area corresponding to the virtual access points;

wherein the method further comprises:

A. obtaining one or more wireless connection requests from the WiFi mobile device for the plurality of virtual access points, wherein the wireless connection request includes beacon information of a corresponding virtual access point;

B. transmitting the one or more wireless connection requests to a corresponding connection controlling device;

C. obtaining scheduling information provided by the connection controlling device based on the one or more wireless connection requests, wherein the scheduling information includes a target virtual access point corresponding to the WiFi mobile device;

D. establishing a wireless connection between the WiFi mobile device and the target virtual access point.

According to another aspect of the invention, a connection controlling device for managing wireless connection of WiFi mobile devices is further provided, wherein the device comprises:

connection request obtaining apparatus for obtaining one or more wireless connection requests from WiFi mobile devices, forwarded by an access point device, for virtual access points of the access point device, wherein the wireless connection requests include beacon information of the corresponding virtual access point;

access information obtaining apparatus for obtaining access-related information of the virtual access point based on the wireless connection request;

schedule determining apparatus for determining scheduling information corresponding to the wireless connection request based on the access-related information, wherein the scheduling information includes a target virtual access point corresponding to the WiFi mobile device in the one or more virtual access points; and providing apparatus for providing the scheduling information to the access point device.

According to another aspect of the invention, an access point device for managing subsidiarily of wireless connection of WiFi mobile devices is further provided, wherein the device comprises:

virtualizing apparatus for virtualizing physical resources on an access point device, to obtain a plurality of virtual access points that are independent one another;

broadcasting apparatus for broadcasting beacon information corresponding to the virtual access points within an area corresponding to the virtual access points;

wherein the device further comprises:

connection request receiving apparatus for obtaining one or more wireless connection requests from the WiFi mobile device for the plurality of virtual access points, wherein the wireless connection request includes beacon information of a corresponding virtual access point;

connection request transmitting apparatus for transmitting the one or more wireless connection requests to a corresponding connection controlling device;

first scheduling obtaining apparatus for obtaining scheduling information provided by the connection controlling device based on the one or more wireless connection requests, wherein the scheduling information includes a target virtual access point corresponding to the WiFi mobile device;

connection establishment apparatus for establishing a wireless connection between the WiFi mobile device and the target virtual access point.

According to another aspect of the invention, a system for managing wireless connection of the WiFi mobile device is further provided, comprising the connection controlling device as aforesaid, and the access point device as aforesaid.

Compared with the prior art, the present invention obtains, through a wireless connection request sent by a WiFi mobile device on a connection controlling device, access-related information of a corresponding virtual access point included in the wireless connection request, and determines scheduling information corresponding to the wireless connection request by the access-related information, and then scheduling the wireless connection request of the WiFi mobile device, thereby reducing the quantity of the WiFi mobile devices that are simultaneously processed by the access point device, lowering the power consumption of the WiFi mobile devices, optimizing power consumption of the mobile devices, and maximizing the service life of the batteries.

Furthermore, a method for managing subsidiarily wireless connection of WiFi mobile devices in an access point device is further provided, the access point device virtualizes physical resources on an access point device, to obtain a plurality of virtual access points that are independent one another, and the virtual access points broadcast beacon information corresponding to the virtual access points within an area corresponding to the virtual access points. In this way, a physical access point is virtualized into a plurality of virtual access points having independent beacons, so as to allocate the WiFi mobile devices evenly among the plurality of virtual access points, avoid beacon transmission of the virtual access points at an appropriate time, and reduce the number of power save mode clients that are simultaneously awakened.

Furthermore, the access point device of the invention could obtain one or more wireless connection requests from the WiFi mobile device for the plurality of virtual access points, transmit the one or more wireless connection requests to a corresponding connection controlling device, and furthermore, obtain scheduling information provided by the connection controlling device based on the one or more wireless connection requests, and establish a wireless connection between the WiFi mobile device and the target virtual access point based on the scheduling information. In this way, the number of WiFi mobile devices that are simultaneously processed by the access point device is reduced, the power consumption of the WiFi mobile devices is lowered, the electrical power consumption of the WiFi mobile devices is optimized, and the battery life is maximized.

Furthermore, the connection controlling device of the invention could obtain the access-related information of the virtual access point based on the wireless connection request, wherein the access-related information includes signal strength information of the virtual access point with respect to the WiFi mobile device. In this way, scheduling information corresponding to the wireless connection request is determined based on the signal strength information, which realizes that the connection controlling device controls and manages virtual access points for the WiFi mobile device, and the WiFi mobile devices are scheduled actively in a power save mode, thereby the energy efficiency is improved, the electrical power consumption of the WiFi mobile devices is optimized, and the battery life is maximized.

Furthermore, the connection controlling device of the invention could obtain the access-related information of the virtual access point based on the wireless connection request, wherein the access-related information includes signal strength information and access ancillary information of the virtual access point with respect to the WiFi mobile device. In this way, scheduling information corresponding to the wireless connection request is determined more accurately according to the signal strength information in conjunction with the access auxiliary information, which realizes that the connection controlling device controls and manages virtual access points for the WiFi mobile device, and the WiFi mobile devices are scheduled actively in a power save mode, thereby the energy efficiency is improved, the electrical power consumption of the WiFi mobile devices is optimized, and the battery life is maximized.

Furthermore, when the scheduling information includes other virtual access points corresponding to the WiFi mobile device, other than the target virtual access point, the access point device could block wireless connection requests of the WiFi mobile device and the other virtual access points. In this way, the power consumption of access points and WiFi mobile device is reduced.

Furthermore, the invention could virtualize physical resources on the access point device based on resource-related information of the access point device, to obtain a plurality of virtual access points that are independent of one another. In this way, the number of WiFi mobile devices that are simultaneously processed by the access point device is reduced, which further lowers the power consumption of the WiFi mobile devices, optimizes the electrical power consumption of the WiFi mobile devices, and maximizes the battery life.

BRIEF DESCRIPTION OF THE DRAWINGS

Other features, purposes and advantages of the invention will become more explicit by means of reading the detailed statement of the non-restrictive embodiments made with reference to the accompanying drawings.

Figure 1:
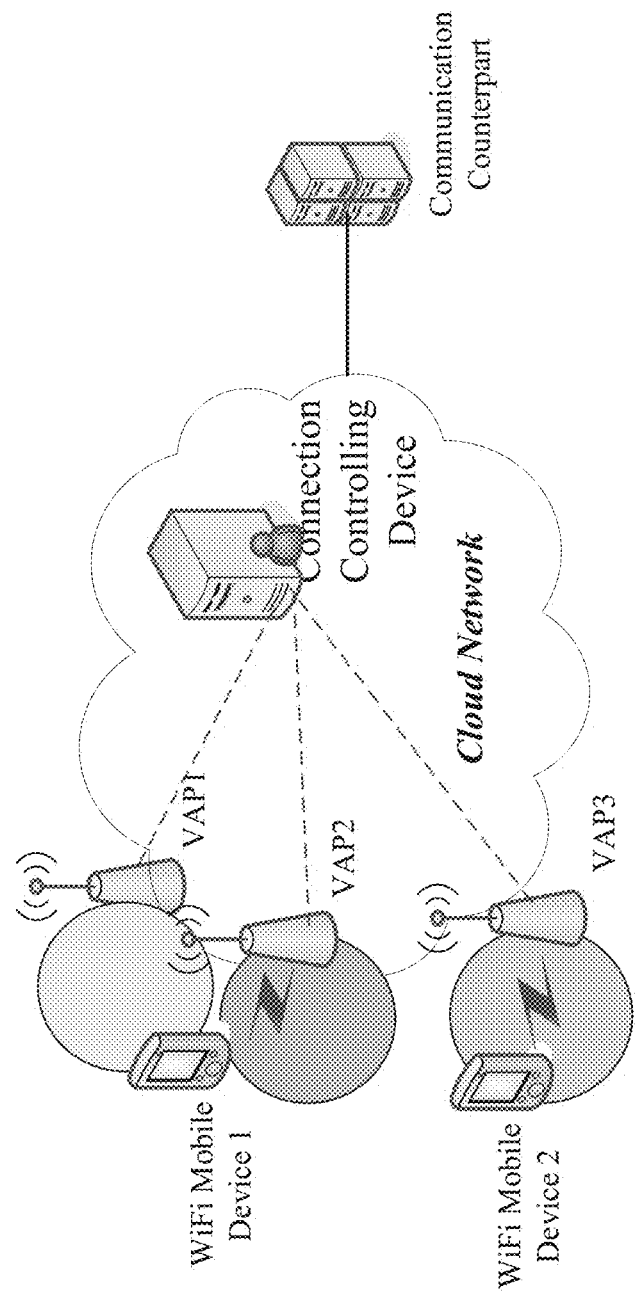
FIG. 1 shows a reference diagram of a system architecture for managing wireless connection of WiFi mobile devices according to one aspect of the present invention.

The same or similar reference signs in the drawings represent the same or similar component parts.

DETAILED DESCRIPTION OF THE INVENTION

Below, details of the invention will be further provided in combination with the accompanying drawings.

FIG. 1 shows a reference diagram of system architecture for managing wireless connection of WiFi mobile devices according to one aspect of the present invention.

Here, the system comprises one or more Virtual Access Points (VAP), the VAP is a logical access point constructed by virtualization technique dividing physical resources and independently starting a virtual machine in a physical access point. By virtualizing the physical access point devices, one physical access point may form one or more VAPs. Each VAP keeps the configuration of belonging domain independently. For example, each VAP has its own independent beacon. Through the VAP, the WiFi mobile device may be connected to the Internet. For example, the VAP forwards data packets to the WiFi mobile device, or forwards the data packets from the WiFi mobile device to the VAP.

The connection controlling device is for controlling and managing one or more VAPs for a WiFi mobile device. Here, the connection controlling device includes, but not limited to, a network device, or a device formed by integrating a plurality of network devices via the network. Here, the network device includes, but not limited to, a computer, a network host, a single network server, a set of a plurality of network servers or a cloud formed by a plurality of network servers; here, the cloud is formed by a considerable number of computers or network servers based on cloud computing, wherein the cloud computing is a kind of distributive computation, which is a virtual supra computer formed by a group of loosely coupled computer sets.

The connection controlling device is connected to the VAPs via a network, wherein the network includes, but not limited to, Internet, Wide Area Network (WAN), Metropolitan Area Network (MAN), Local Area Network (LAN), Virtual Private Network (VPN), Ad Hoc network, and the like. The communication modes between the connection controlling device and the plurality of VAPs are independent of each other.

The one or more VAPs and the connection controlling device form a cloud network, and the VAPs are provided in a cloud manner.

Those skilled in the art should understand that the connection controlling device may be implemented on one access point device (i.e., the access point device may perform the scheduling function at the same time) or implemented independent of the access point device (e.g., the connection controlling device may serve one or more access point devices).

Those skilled in the art should understand that the aforesaid connection controlling device, access point device, the network connected therebetween, and the communication mode are only exemplary, and other existing or future possibly evolving connection controlling device, access point device, network connected therebetween, and communication mode, if applicable to the present invention, should also be included with the protection scope of the present invention, which are incorporated here by reference.

Figure 2:
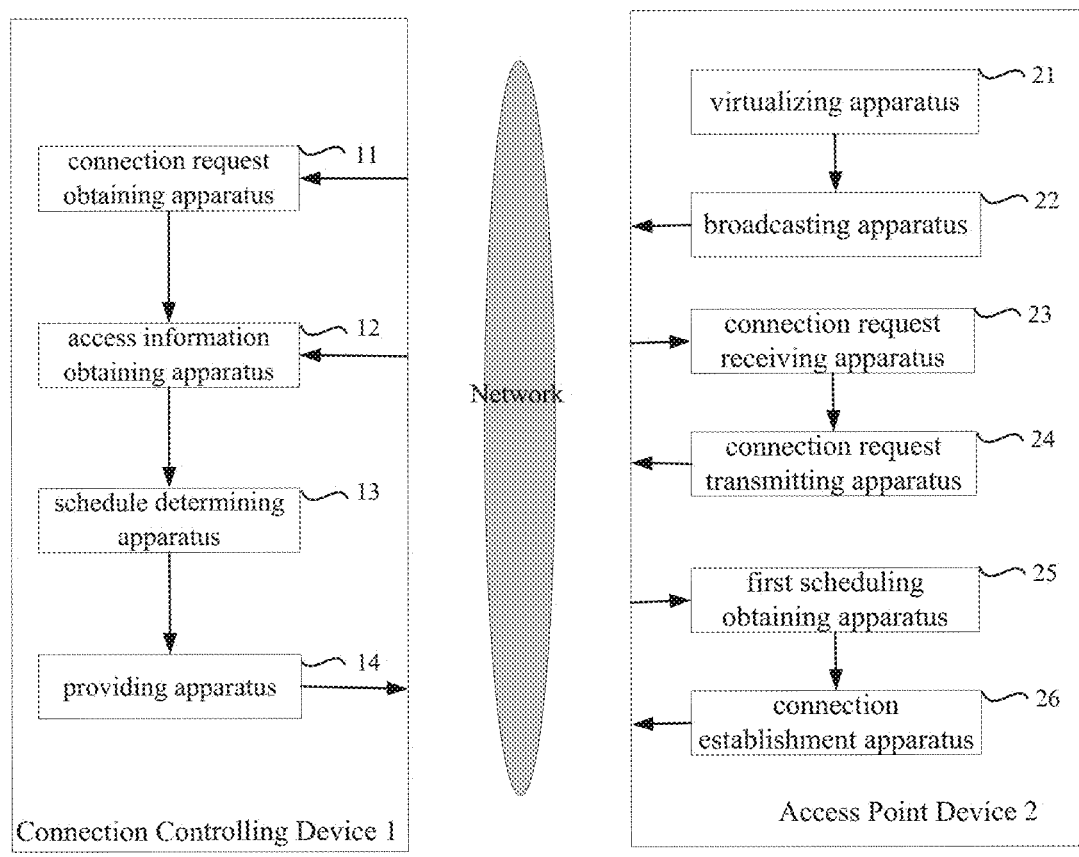
FIG. 2 shows a schematic diagram of a connection controlling device and an access point device for managing wireless connection of WiFi mobile devices according to one aspect of the present invention.

FIG. 2 shows a schematic diagram of a connection controlling device and an access point device for managing wireless connection of WiFi mobile devices according to one aspect of the present invention; wherein the connection controlling device 1 comprises: a connection request obtaining apparatus 11, an access information obtaining apparatus 12, a schedule determining apparatus 13, a providing apparatus 14; the access point device 2 comprises: a virtualizing apparatus 21, a broadcasting apparatus 22, a connection request receiving apparatus 23, a connection request transmitting apparatus 24, a first scheduling obtaining apparatus 25, a connection establishment apparatus 26. Various apparatus of the connection controlling device 1 and the access point device 2 cooperate with one another to perform management of wireless connection of the WiFi mobile devices.

Specifically, the virtualizing apparatus 21 of the access point device 2 virtualizes physical resources on the access point device, to obtain a plurality of virtual access points that are independent one another; the broadcasting apparatus 22 broadcasts beacon information corresponding to the virtual access points within an area corresponding to the virtual access points; the connection request receiving apparatus 23 obtains one or more wireless connection requests from the WiFi mobile device for the plurality of virtual access points, wherein the wireless connection request includes beacon information of a corresponding virtual access point; the connection request transmitting apparatus 24 transmits the one or more wireless connection requests to a corresponding connection controlling device; the connection request obtaining apparatus 11 of the connection controlling device 1 obtains one or more wireless connection requests from WiFi mobile devices, forwarded by an access point device, for virtual access points of the access point device, wherein the wireless connection requests include beacon information of the corresponding virtual access point; the access information obtaining apparatus 12 obtains access-related information of the virtual access point based on the wireless connection request; the schedule determining apparatus 13 determines scheduling information corresponding to the wireless connection request based on the access-related information, wherein the scheduling information includes a target virtual access point corresponding to the WiFi mobile device in the one or more virtual access points; the providing apparatus 14 provides the scheduling information to the access point device; the first scheduling obtaining apparatus 25 of the access point device 2 obtains scheduling information provided by the connection controlling device based on the one or more wireless connection requests, wherein the scheduling information includes a target virtual access point corresponding to the WiFi mobile device; the connection establishment apparatus 26 establishes a wireless connection between the WiFi mobile device and the target virtual access point.

The above apparatuses work constantly therebetween. Here, those skilled in the art should understand that "constantly" means the above various apparatuses perform obtaining and transmitting of a wireless connection request at the access point device, perform obtaining of the wireless connection request and access-related information, determining and providing of scheduling information at the connection controlling device, and perform obtaining of scheduling information and establishing of wireless connection at the access point device, respectively in real-time or according a preset or real-time adjusted working pattern requirements, until the access point device stops obtaining of one or more wireless connection requests from the WiFi mobile device for the plurality of virtual access points.

The virtualizing apparatus 21 of the access point device 2 virtualizes physical resources on an access point device, to obtain a plurality of virtual access points that are independent one another.

Specifically, the virtualizing apparatus 21 isolates the physical resources on the access point device by a virtualization technology to form one or more logical access points that may independently start a virtual machine on the access point device. Each virtual access point has independent configuration information, e.g., each virtual access point has its own independent beacon. For example, according to a predetermined virtualization solution, each access point device is virtualized into N virtual access points with independent configuration information. Through the virtual access point, the WiFi mobile device could be connected to the Internet. For example, the virtual access point forwards the data packets to the WiFi mobile device, or forwards the data packets to the virtual access point from the WiFi mobile device.

Preferably, the virtualizing apparatus 21 could virtualize physical resources on the access point device based on resource-related information of the access point device, to obtain a plurality of virtual access points that are independent of one another.

Specifically, the virtualizing apparatus 21 could isolate the physical resources on the access point device by a virtualization technology based on the resource-related information of the access point device, to form one or more logical access points that may independently start a virtual machine on the access point device. Each virtual access point has its independent configuration information, e.g., each virtual access point has its own independent beacon. Here, the resource-related information includes, but not limited to, power information, bandwidth information, maximum number of the mobile devices that can be connected of the access point device, etc. For example, if the resource information owned by the first access point device is more than that owned by the second access point device (e.g., larger power), then the number of virtual access points which is formed by the first access point device virtualized is greater than that by the second access point device virtualized.

The broadcasting apparatus 22 broadcasts beacon information corresponding to the virtual access points within an area corresponding to the virtual access points.

Specifically, each virtual access point has its independent beacon. The broadcasting apparatus 22 periodically broadcasts the beacon information corresponding to the virtual access point within an area corresponding to the virtual access point. When the WiFi mobile device enters into the area covered by the virtual access point, the WiFi mobile device will receive the beacon information of the virtual access point.

The connection request receiving apparatus 23 obtains one or more wireless connection requests from the WiFi mobile device for the plurality of virtual access points, wherein the wireless connection request includes beacon information of a corresponding virtual access point.

Specifically, the connection request receiving apparatus 23 obtains one or more wireless connection requests from the WiFi mobile device for the plurality of virtual access points from the WiFi mobile devices, wherein the wireless connection request includes beacon information of a corresponding virtual access point. Here, the WiFi mobile device may transmit wireless connection requests to a plurality of virtual access points of the same access point device, respectively, wherein the plurality of wireless connection requests include beacon information of a corresponding virtual access point, respectively. The WiFi mobile device may transmit a plurality of wireless connection requests to a plurality of virtual access points of different access point devices, wherein the plurality of wireless connection requests include beacon information of a corresponding virtual access point, respectively.

The connection request transmitting apparatus 24 transmits the one or more wireless connection requests to a corresponding connection controlling device.

Specifically, the connection request transmitting apparatus 24 transmits the connection request information which includes the corresponding virtual access point to the connection controlling device corresponding to the access point device in a communication mode specified for example in 802.11 protocol, wherein each wireless connection request includes WiFi mobile device information corresponding to the wireless connection request and the corresponding virtual access point information.

The connection request obtaining apparatus 11 of the connection controlling device 1 obtains one or more wireless connection requests from WiFi mobile devices, forwarded by an access point device, for virtual access points of the access point device, wherein the wireless connection requests include beacon information of the corresponding virtual access point.

Specifically, the connection request obtaining apparatus 11 obtains, from the access point device, one or more wireless connection requests from the WiFi mobile device for the virtual access points in the access point device, wherein the wireless connection request is transmitted by the access point device in the communication mode specified for example in the 802.11 protocol. Here, the wireless connection request may be one or more wireless connection requests sent from the same access point device, or one or more wireless connection requests sent from different access point devices.

The access information obtaining apparatus 12 obtains access-related information of the virtual access point based on the wireless connection request.

Specifically, the access information obtaining apparatus 12 obtains access-related information of the virtual access point through interaction with the virtual access point according to the wireless connection request based on the virtual access point information included in the wireless connection request.

Preferably, the access-related information includes signal strength information of the virtual access point with respect to the WiFi mobile device.

More preferably, the access-related information includes signal strength information and access ancillary information of the virtual access point with respect to the WiFi mobile device, wherein the access auxiliary information includes at least one of the following:

- location information corresponding to the WiFi mobile device and/or the access point device, wherein the location information is for example location information obtained based on GPS positioning, or obtained by positioning based on other already positioned wireless access devices (e.g., WiFi).
- load-related information corresponding to the access point device and/or virtual access point, wherein the load-related information, e.g., is the information of WiFi mobile devices currently connected to the access point device and/or the virtual access point, such as the number, power information, bandwidth information, etc.

The schedule determining apparatus 13 determines scheduling information corresponding to the wireless connection request based on the access-related information, wherein the scheduling information includes a target virtual access point corresponding to the WiFi mobile device in the one or more virtual access points.

Specifically, the schedule determining apparatus 13 determines schedule information corresponding to the wireless connection request based on the access-related information according to the preselected manner, thereby to perform a positive scheduling manner; for example, when the access-related information includes signal strength information of the virtual access point with respect to the WiFi mobile device, then the schedule determining apparatus 13 selects the virtual access point with highest strength information as the target virtual access point corresponding to the WiFi mobile device; when the access-related information includes signal strength information and access ancillary information of the virtual access point with respect to the WiFi mobile device, the schedule determining apparatus 13 determines the target virtual access point corresponding to the WiFi mobile device based on the signal strength information in combination with the access ancillary information. Here, for example, when signal strength information of two virtual access points with respect to the WiFi mobile device is identical, the virtual access point with low load-related information is selected as the target access point; if the virtual access points correspond to different access point devices, the virtual access point corresponding to the access point device with a low load may also be selected as the target access point based on the load-related information of the access point device; or, for example, when the signal strength information of two virtual access points with respect to the WiFi mobile device is identical, the virtual access point corresponding to an access point device which is located nearer to the WiFi mobile device is selected as the target access point, etc.

It should be understood that the above example is only for better explaining the technical solution of the present invention, not for limiting the present invention. Those skilled in the art should understand, any implementation of determining the scheduling information corresponding to the wireless connection request based on the access-related information, which should be included within the scope of the present invention.

The providing apparatus 14 provides the scheduling information to the access point device.

Specifically, the providing apparatus 14 transmits the scheduling information which includes the target virtual access point to the access point device corresponding to the wireless connection request in a communication mode as specified for example in 802.11 protocol.

The first scheduling obtaining apparatus 25 obtains scheduling information provided by the connection controlling device based on the one or more wireless connection requests, wherein the scheduling information includes a target virtual access point corresponding to the WiFi mobile device.

Specifically, the first scheduling obtaining apparatus 25 obtains scheduling information sent by the connection controlling device 1 as provided based on the one or more wireless connection requests in a communication mode specified for example in 802.11 protocol, wherein the scheduling information includes a target virtual access point corresponding to the WiFi mobile device, and the target virtual access point belongs to the access point device 2.

The connection establishment apparatus 26 establishes a wireless connection between the WiFi mobile device and the target virtual access point.

Specifically, the connection establishment apparatus 26 establishes a wireless connection between the WiFi mobile device and the target virtual access point based on the scheduling information.

Figure 3:
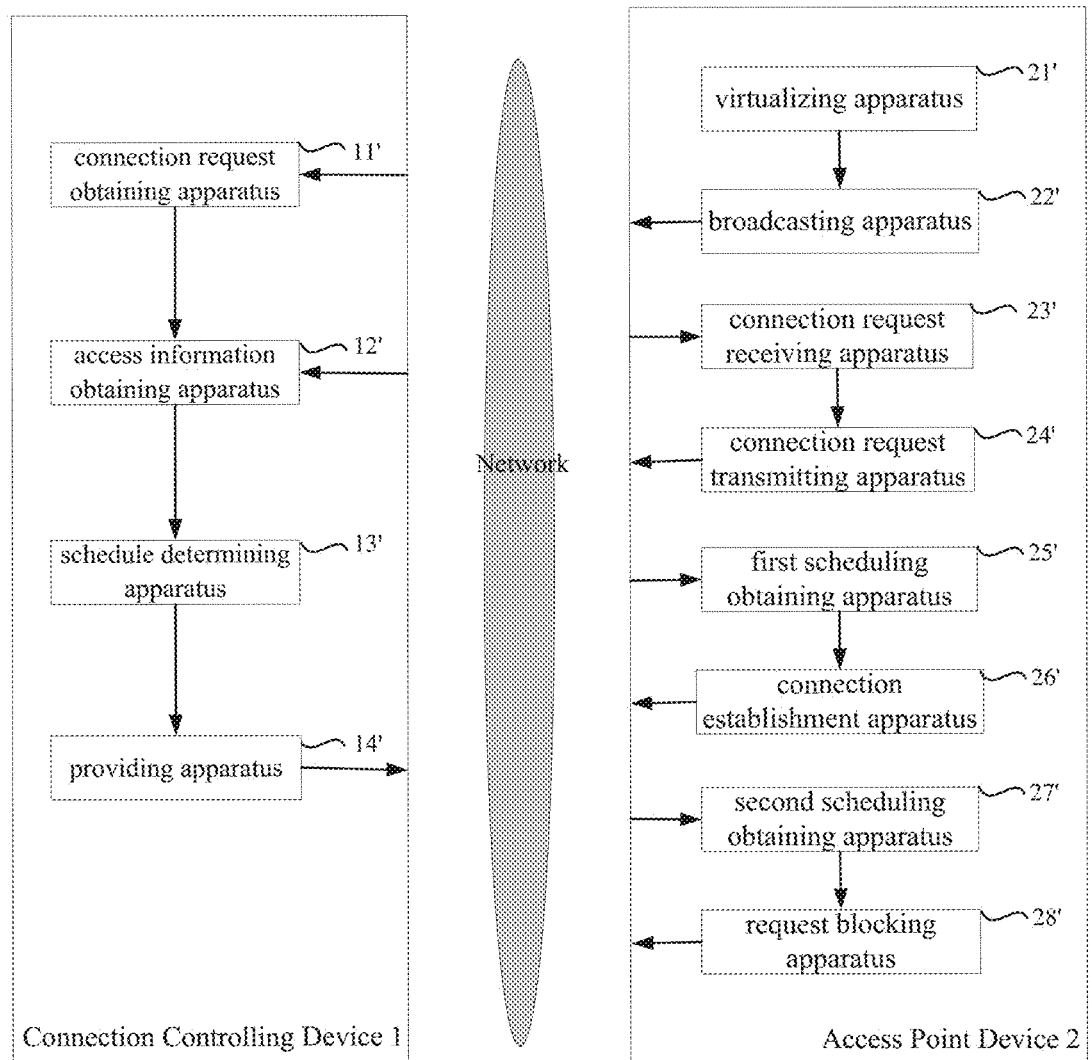
FIG. 3 shows a schematic diagram of a connection controlling device and an access point device for managing wireless connection of WiFi mobile devices according to a preferred embodiment of the present invention.

FIG. 3 shows a schematic diagram of a connection controlling device and an access point device for managing wireless connection of WiFi mobile devices according to a preferred embodiment of the present invention; wherein the connection controlling device 1 comprises: a connection request obtaining apparatus 11', an access information obtaining apparatus 12', a schedule determining apparatus 13', a providing apparatus 14'; the access point device 2 comprises: a virtualizing apparatus 21', a broadcasting apparatus 22', a connection request receiving apparatus 23', a connection request transmitting apparatus 24', a first scheduling obtaining apparatus 25', a connection establishment apparatus 26', a second scheduling obtaining apparatus 27', a request blocking apparatus 28'. Various apparatus of the connection controlling device 1 and the access point device 2 cooperate with one another to perform management of wireless connection of the WiFi mobile devices.

Specifically, the virtualizing apparatus 21' of the access point device 2 virtualizes physical resources on the access point device, to obtain a plurality of virtual access points that are independent one another; the broadcasting apparatus 22' broadcasts beacon information corresponding to the virtual access points within an area corresponding to the virtual access points; the connection request receiving apparatus 23' obtains one or more wireless connection requests from the WiFi mobile device for the plurality of virtual access points, wherein the wireless connection request includes beacon information of a corresponding virtual access point; the connection request transmitting apparatus 24' transmits the one or more wireless connection requests to a corresponding connection controlling device; the connection request obtaining apparatus 11' of the connection controlling device 1 obtains one or more wireless connection requests from WiFi mobile devices, forwarded by an access point device, for virtual access points of the access point device, wherein the wireless connection requests include beacon information of the corresponding virtual access point; the access information obtaining apparatus 12' obtains access-related information of the virtual access point based on the wireless connection request; the schedule determining apparatus 13' determines scheduling information corresponding to the wireless connection request based on the access-related information, wherein the scheduling information includes a target virtual access point corresponding to the WiFi mobile device in the one or more virtual access points; the providing apparatus 14' provides the scheduling information to the access point device; the first scheduling obtaining apparatus 25' of the access point device 2 obtains scheduling information provided by the connection controlling device based on the one or more wireless connection requests, wherein the scheduling information includes a target virtual access point corresponding to the WiFi mobile device; the connection establishment apparatus 26' establishes a wireless connection between the WiFi mobile device and the target virtual access point; the second scheduling obtaining apparatus 27' obtains scheduling information provided by the connection controlling device based on the one or more wireless connection requests, wherein the scheduling information includes other virtual access points corresponding to the WiFi mobile device, other than the target virtual access point; the request blocking apparatus 28' blocks wireless connection requests of the WiFi mobile device and the other virtual access points based on the scheduling information.

The above apparatuses work constantly therebetween. Here, those skilled in the art should understand that "constantly" means the above various apparatuses perform obtaining and transmitting of a wireless connection request at the access point device, perform obtaining of the wireless connection request and access-related information, determining and providing of scheduling information at the connection controlling device, and perform obtaining of scheduling information, establishing of wireless connection or blocking of wireless connection request at the access point device, respectively in real-time or according a preset or real-time adjusted working pattern requirements, until the access point device stops obtaining of one or more wireless connection requests from the WiFi mobile device for the plurality of virtual access points.

Herein, the connection request obtaining apparatus 11', the access information obtaining apparatus 12', the schedule determining apparatus 13', the providing apparatus 14' of the connection controlling device 1 and the virtualizing apparatus 21', the broadcasting apparatus 22', the connection request receiving apparatus 23', the connection request transmitting apparatus 24', the first scheduling obtaining apparatus 25', the connection establishment apparatus 26' of the access point device 2 are identical or substantially identical to corresponding apparatus shown in FIG. 1, which are thus not detailed here, but incorporated here by reference.

The second scheduling obtaining apparatus 27' obtains scheduling information provided by the connection controlling device based on the one or more wireless connection requests, wherein the scheduling information includes other virtual access points corresponding to the WiFi mobile device, other than the target virtual access point.

Specifically, the second scheduling obtaining apparatus 27' obtains scheduling information sent by the connection controlling device 1 as provided based on the one or more wireless connection requests in a communication mode as specified for example in 802.11 protocol, wherein the scheduling information includes other virtual access points corresponding to the WiFi mobile device, other than the target virtual access point, and the other virtual access points belong to the access point device 2.

The request blocking apparatus 28' blocks wireless connection requests of the WiFi mobile device and the other virtual access points based on the scheduling information.

Specifically, the request blocking apparatus 28' stops broadcasting beacon information to the WiFi mobile device based on the scheduling information for example by adding the WiFi mobile device into a blocking list, thereby blocking the wireless connection request of the WiFi mobile device and the other virtual access points.

Here, those skilled in the art should understand, for the first scheduling obtaining apparatus 25', the connection establishment apparatus 26', the second scheduling obtaining apparatus 27', and the request blocking apparatus 28' of the same access point device, they may act as common apparatuses in the access point device to schedule, based on the scheduling information received by the access point device, the virtual access points corresponding to the scheduling information; they may also belong to different virtual access points, e.g., the first scheduling obtaining apparatus 25' and the connection establishment apparatus 26' belong to the target virtual access point; the second scheduling obtaining apparatus 27' and the request blocking apparatus 28' belong to other virtual access points; or both the target virtual access point or the other virtual access points include the first scheduling obtaining apparatus 25', the connection establishment apparatus 26', the second scheduling obtaining apparatus 27', and request blocking apparatus 28' such that the corresponding apparatuses perform corresponding operations based on different schedule requests.

Figure 4:
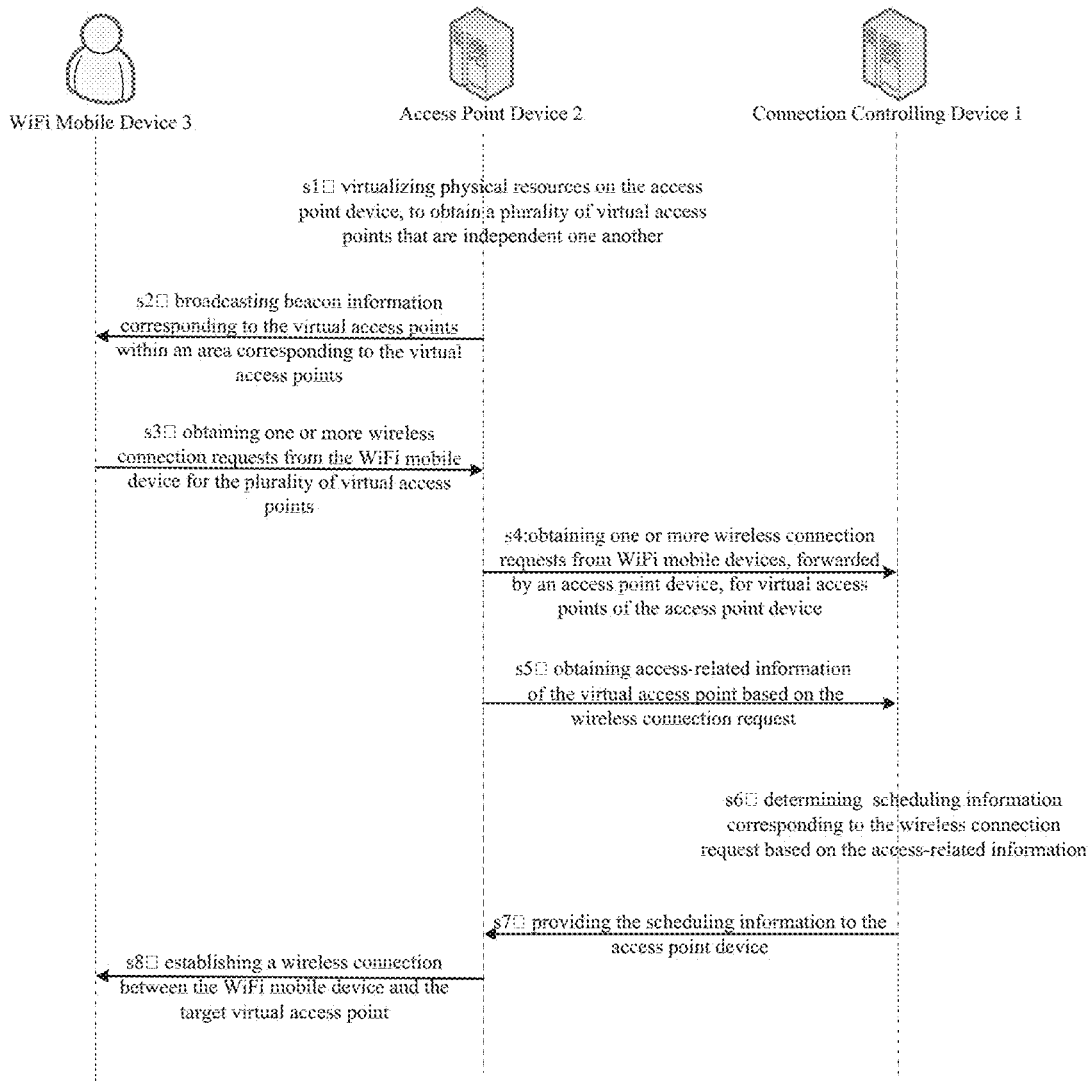
FIG. 4 shows a flow diagram of a method for managing wireless connection of WiFi mobile devices implemented by cooperation of a connection controlling device and an access point device according to another aspect of the present invention.

FIG. 4 shows a flow diagram of a method for managing wireless connection of WiFi mobile devices implemented by cooperation of a connection controlling device and an access point device according to another aspect of the present invention.

Specifically, in the step s1, the access point device 2 virtualizes physical resources on the access point device, to obtain a plurality of virtual access points that are independent one another; in the step s2, the access point device 2 broadcasts beacon information corresponding to the virtual access points within an area corresponding to the virtual access points; in the step s3, the access point device 2 obtains one or more wireless connection requests from the WiFi mobile device for the plurality of virtual access points, wherein the wireless connection request includes beacon information of a corresponding virtual access point; in the step s4, the access point device 2 transmits the one or more wireless connection requests to a corresponding connection controlling device; accordingly, in the step s4, the connection controlling device 1 obtains one or more wireless connection requests from WiFi mobile devices, forwarded by an access point device, for virtual access points of the access point device, wherein the wireless connection requests include beacon information of the corresponding virtual access point; in the step s5, the connection controlling device 1 obtains access-related information of the virtual access point based on the wireless connection request; in the step s6, the connection controlling device 1 determines scheduling information corresponding to the wireless connection request based on the access-related information, wherein the scheduling information includes a target virtual access point corresponding to the WiFi mobile device in the one or more virtual access points; in the step s7, the connection controlling device 1 provides the scheduling information to the access point device; accordingly, in the step s7, the access point device 2 obtains scheduling information provided by the connection controlling device based on the one or more wireless connection requests, wherein the scheduling information includes a target virtual access point corresponding to the WiFi mobile device; in the step s8, the access point device 2 establishes a wireless connection between the WiFi mobile device and the target virtual access point.

The above steps work constantly therebetween. Here, those skilled in the art should understand that "constantly" means the above various steps perform obtaining and transmitting of a wireless connection request at the access point device, perform obtaining of the wireless connection request and access-related information, determining and providing of scheduling information at the connection controlling device, and perform obtaining of scheduling information and establishing of wireless connection at the access point device, respectively in real-time or according a preset or real-time adjusted working pattern requirements, until the access point device stops obtaining of one or more wireless connection requests from the WiFi mobile device for the plurality of virtual access points.

In the step s1, the access point device 2 virtualizes physical resources on an access point device, to obtain a plurality of virtual access points that are independent one another.

Specifically, in the step s1, the access point device 2 isolates the physical resources on the access point device by a virtualization technology to form one or more logical access points that may independently start a virtual machine on the access point device. Each virtual access point has independent configuration information, e.g., each virtual access point has its own independent beacon. For example, according to a predetermined virtualization solution, each access point device is virtualized into N virtual access points with independent configuration information. Through the virtual access point, the WiFi mobile device could be connected to the Internet. For example, the virtual access point forwards the data packets to the WiFi mobile device, or forwards the data packets to the virtual access point from the WiFi mobile device.

Preferably, in the step s1, the access point device 2 could virtualize physical resources on the access point device based on resource-related information of the access point device, to obtain a plurality of virtual access points that are independent of one another.

Specifically, in the step s1, the access point device 2 could isolate the physical resources on the access point device by a virtualization technology based on the resource-related information of the access point device, to form one or more logical access points that may independently start a virtual machine on the access point device. Each virtual access point has its independent configuration information, e.g., each virtual access point has its own independent beacon. Here, the resource-related information includes, but not limited to, power information, bandwidth information, maximum number of the mobile devices that can be connected of the access point device, etc. For example, if the resource information owned by the first access point device is more than that owned by the second access point device (e.g., larger power), then the number of virtual access points which is formed by the first access point device virtualized is greater than that by the second access point device virtualized.

In the step s2, the access point device 2 broadcasts beacon information corresponding to the virtual access points within an area corresponding to the virtual access points.

Specifically, each virtual access point has its independent beacon. In the step s2, the access point device 2 periodically broadcasts the beacon information corresponding to the virtual access point within an area corresponding to the virtual access point. When the WiFi mobile device enters into the area covered by the virtual access point, the WiFi mobile device will receive the beacon information of the virtual access point.

In the step s3, the access point device 2 obtains one or more wireless connection requests from the WiFi mobile device for the plurality of virtual access points, wherein the wireless connection request includes beacon information of a corresponding virtual access point.

Specifically, in the step s3, the access point device 2 obtains one or more wireless connection requests of the WiFi mobile device to the plurality of virtual access points from the WiFi mobile devices, wherein the wireless connection request includes beacon information of a corresponding virtual access point. Here, the WiFi mobile device may transmit wireless connection requests to a plurality of virtual access points of the same access point device, respectively, wherein the plurality of wireless connection requests include beacon information of a corresponding virtual access point, respectively. The WiFi mobile device may transmit a plurality of wireless connection requests to a plurality of virtual access points of different access point devices, wherein the plurality of wireless connection requests include beacon information of a corresponding virtual access point, respectively.

In the step s4, the access point device 2 transmits the one or more wireless connection requests to a corresponding connection controlling device.

Specifically, in the step s4, the access point device 2 transmits the connection request information which includes the corresponding virtual access point to the connection controlling device corresponding to the access point device in a communication mode specified for example in 802.11 protocol, wherein each wireless connection request includes WiFi mobile device information corresponding to the wireless connection request and the corresponding virtual access point information.

Accordingly, in the step s4, the connection controlling device 1 obtains one or more wireless connection requests from WiFi mobile devices, forwarded by an access point device, for virtual access points of the access point device, wherein the wireless connection requests include beacon information of the corresponding virtual access point.

Specifically, in the step s4, the connection controlling device 1 obtains, from the access point device, one or more wireless connection requests from the WiFi mobile device for the virtual access points in the access point device, wherein the wireless connection request is transmitted by the access point device in the communication mode specified for example in the 802.11 protocol. Here, the wireless connection request may be one or more wireless connection requests sent from the same access point device, or one or more wireless connection requests sent from different access point devices.

In the step s5, the connection controlling device 1 obtains access-related information of the virtual access point based on the wireless connection request.

Specifically, in the step s5, the connection controlling device 1 obtains access-related information of the virtual access point through interaction with the virtual access point according to the wireless connection request based on the virtual access point information included in the wireless connection request.

Preferably, the access-related information includes signal strength information of the virtual access point with respect to the WiFi mobile device.

More preferably, the access-related information includes signal strength information and access ancillary information of the virtual access point with respect to the WiFi mobile device, wherein the access auxiliary information includes at least one of the following:

location information corresponding to the WiFi mobile device and/or the access point device, wherein the location information is for example location information obtained based on GPS positioning, or obtained by positioning based on other already positioned wireless access devices (e.g., WiFi).

load-related information corresponding to the access point device and/or virtual access point, wherein the load-related information, e.g., is the information of WiFi mobile devices currently connected to the access point device and/or the virtual access point, such as the number, power information, bandwidth information, etc.

In the step s6, the connection controlling device 1 determines scheduling information corresponding to the wireless connection request based on the access-related information, wherein the scheduling information includes a target virtual access point corresponding to the WiFi mobile device in the one or more virtual access points.

Specifically, in the step s6, the connection controlling device 1 determines schedule information corresponding to the wireless connection request based on the access-related information according to the preselected manner, thereby to perform a positive scheduling manner; for example, when the access-related information includes signal strength information of the virtual access point with respect to the WiFi mobile device, then in the step s6, the connection controlling device 1 selects the virtual access point with highest strength information as the target virtual access point corresponding to the WiFi mobile device; when the access-related information includes signal strength information and access ancillary information of the virtual access point with respect to the WiFi mobile device, in the step s6, the connection controlling device 1 determines the target virtual access point corresponding to the WiFi mobile device based on the signal strength information in combination with the access ancillary information. Here, for example, when signal strength information of two virtual access points with respect to the WiFi mobile device is identical, the virtual access point with low load-related information is selected as the target access point; if the virtual access points correspond to different access point devices, the virtual access point corresponding to the access point device with a low load may also be selected as the target access point based on the load-related information of the access point device; or, for example, when the signal strength information of two virtual access points with respect to the WiFi mobile device is identical, the virtual access point corresponding to an access point device which is located nearer to the WiFi mobile device is selected as the target access point, etc.

It should be understood that the above example is only for better explaining the technical solution of the present invention, not for limiting the present invention. Those skilled in the art should understand, any implementation of determining the scheduling information corresponding to the wireless connection request based on the access-related information, which should be included within the scope of the present invention.

In the step s7, the connection controlling device 1 provides the scheduling information to the access point device.

Specifically, in the step s7, the connection controlling device 1 transmits the scheduling information which includes the target virtual access point to the access point device corresponding to the wireless connection request in a communication mode as specified for example in 802.11 protocol.

Accordingly, in the step s7, the access point device 2 obtains scheduling information provided by the connection controlling device based on the one or more wireless connection requests, wherein the scheduling information includes a target virtual access point corresponding to the WiFi mobile device.

Specifically, in the step s7, the access point device 2 obtains scheduling information sent by the connection controlling device 1 as provided based on the one or more wireless connection requests in a communication mode specified for example in 802.11 protocol, wherein the scheduling information includes a target virtual access point corresponding to the WiFi mobile device, and the target virtual access point belongs to the access point device 2.

In the step s8, the access point device 2 establishes a wireless connection between the WiFi mobile device and the target virtual access point.

Specifically, in the step s8, the access point device 2 establishes a wireless connection between the WiFi mobile device and the target virtual access point based on the scheduling information.

Figure 5:
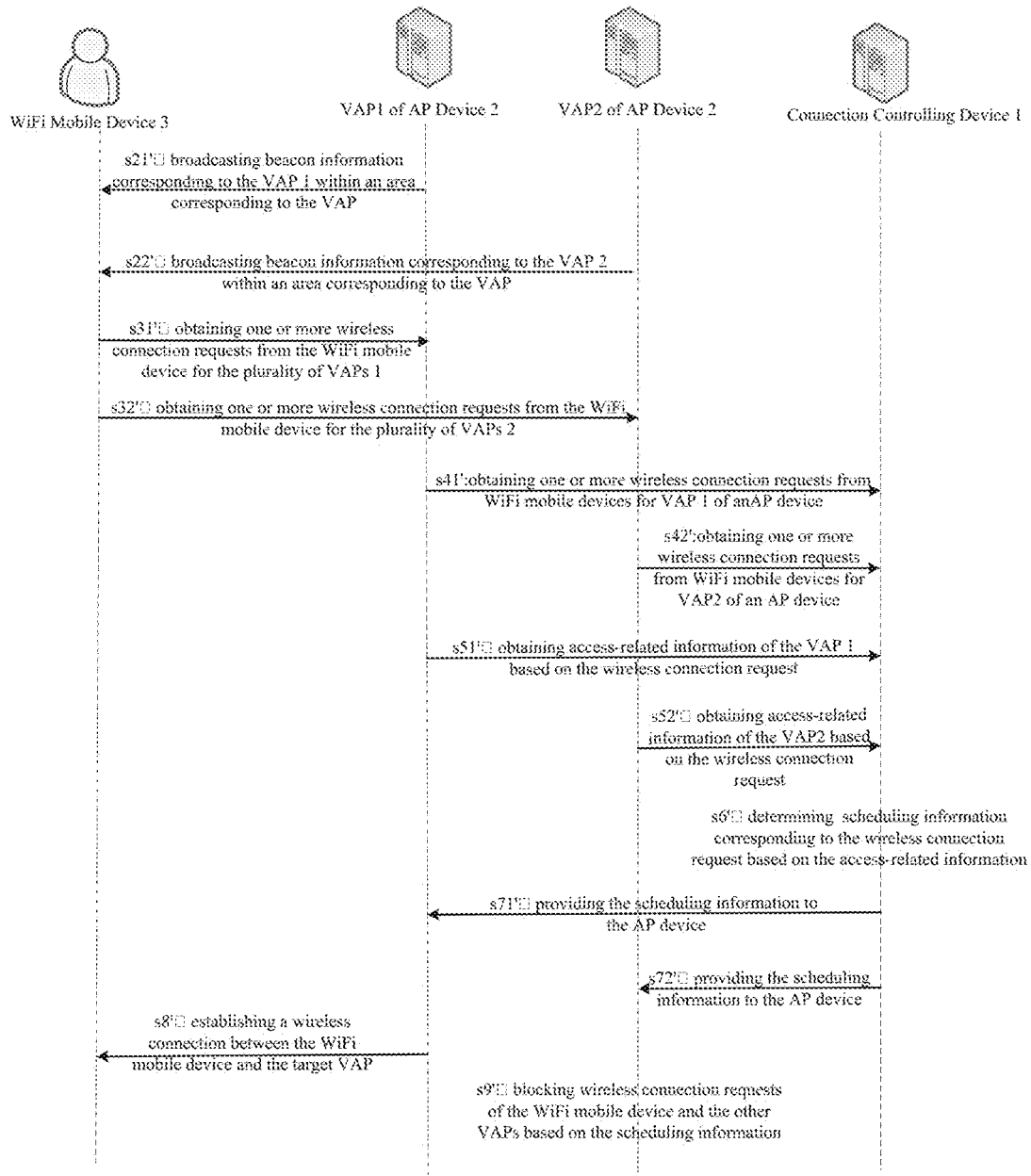
FIG. 5 shows a flow diagram of a method for managing wireless connection of WiFi mobile devices implemented by cooperation of a connection controlling device and an access point device according to a preferred embodiment of the present invention.

FIG. 5 shows a flow diagram of a method for managing wireless connection of WiFi mobile devices implemented by cooperation of a connection controlling device and an access point device according to a preferred embodiment of the present invention; wherein, the access point device 2 comprises virtual access point 1 and virtual access point 2.

Specifically, in the step s21', the virtual access point 1 of the access point device 2 broadcasts beacon information corresponding to the virtual access point 1 within an area corresponding to the virtual access point; in the step s22', the virtual access point 2 of the access point device 2 broadcasts beacon information corresponding to the virtual access point 2 within an area corresponding to the virtual access point; in the step s31', the virtual access point 1 of the access point device 2 obtains one or more wireless connection requests from the WiFi mobile device for the plurality of virtual access points 1, wherein the wireless connection request includes beacon information of a corresponding virtual access point 1; in the step s32', the virtual access point 2 of the access point device 2 obtains one or more wireless connection requests from the WiFi mobile device for the plurality of virtual access points 2, wherein the wireless connection request includes beacon information of a corresponding virtual access point 2; in the step s41', the virtual access point 1 of the access point device 2 transmits the one or more wireless connection requests to a corresponding connection controlling device; accordingly, in the step s41', the connection controlling device 1 obtains one or more wireless connection requests from WiFi mobile devices for virtual access point 1 of an access point device, wherein the wireless connection request is sent by the access point device and includes beacon information of the corresponding virtual access point; in the step s42', the virtual access point 2 of the access point device 2 transmits the one or more wireless connection requests to a corresponding connection controlling device; accordingly, in the step s42', the connection controlling device 1 obtains one or more wireless connection requests from WiFi mobile devices for virtual access point 2 of an access point device, wherein the wireless connection request is sent by the access point device and includes beacon information of the corresponding virtual access point; in the step s51', the connection controlling device 1 obtains access-related information of the virtual access point 1 based on the wireless connection request; in the step s52', the connection controlling device 1 obtains access-related information of the virtual access point 2 based on the wireless connection request; in the step s6', the connection controlling device 1 determines scheduling information corresponding to the wireless connection request based on the access-related information, wherein the scheduling information includes a target virtual access point corresponding to the WiFi mobile device in the one or more virtual access points; in the step s71', the connection controlling device 1 provides the scheduling information to the virtual access point 1 of the access point device 2; accordingly, in the step s71', the virtual access point 1 of the access point device 2 obtains scheduling information provided by the connection controlling device based on the one or more wireless connection requests, wherein the scheduling information includes a target virtual access point corresponding to the WiFi mobile device; in the step s8', the virtual access point 1 of the access point device 2 establishes a wireless connection between the WiFi mobile device and the target virtual access point; in the step s72', the connection controlling device 1 provides the scheduling information to the virtual access point 2 of the access point device 2; accordingly, in the step s72', the virtual access point 2 of the access point device 2 obtains scheduling information provided by the connection controlling device based on the one or more wireless connection requests, wherein the scheduling information includes other virtual access points corresponding to the WiFi mobile device, other than the target virtual access point; in the step s9', the virtual access point 2 of the access point device 2 blocks wireless connection requests of the WiFi mobile device and the other virtual access points based on the scheduling information.

Herein, the step s21' and the step s22' are identical or substantially identical to step s2 shown in FIG. 4; the step s31' and the step s32' are identical or substantially identical to step s3 shown in FIG. 4; the step s41' and the step s42' are identical or substantially identical to step s4 shown in FIG. 4; the step s51' and the step s52' are identical or substantially identical to step s5 shown in FIG. 4; the step s6' is identical or substantially identical to step s6 shown in FIG. 4; the step s71' is identical or substantially identical to step s7 shown in FIG. 4; the step s8' is identical or substantially identical to step s8 shown in FIG. 4; which are thus not detailed here, but incorporated here by reference.

The above steps work constantly therebetween. Here, those skilled in the art should understand that "constantly" means the above various steps perform obtaining and transmitting of a wireless connection request at the access point device, perform obtaining of the wireless connection request and access-related information, determining and providing of scheduling information at the connection controlling device, and perform obtaining of scheduling information, establishing of wireless connection or blocking of wireless connection request at the access point device, respectively in real-time or according a preset or real-time adjusted working pattern requirements, until the access point device stops obtaining of one or more wireless connection requests from the WiFi mobile device for the plurality of virtual access points.

In the step s72', the virtual access point 2 of the access point device 2 obtains scheduling information provided by the connection controlling device based on the one or more wireless connection requests, wherein the scheduling information includes other virtual access points corresponding to the WiFi mobile device, other than the target virtual access point.

Specifically, in the step s72', the virtual access point 2 of the access point device 2 obtains scheduling information sent by the connection controlling device 1 as provided based on the one or more wireless connection requests in a communication mode as specified for example in 802.11 protocol, wherein the scheduling information includes other virtual access points corresponding to the WiFi mobile device, other than the target virtual access point, and the other virtual access points belong to the access point device 2.

In the step s9', the virtual access point 2 of the access point device 2 blocks wireless connection requests of the WiFi mobile device and the other virtual access points based on the scheduling information.

Specifically, in the step s9', the virtual access point 2 of the access point device 2 stops broadcasting beacon information to the WiFi mobile device based on the scheduling information for example by adding the WiFi mobile device into a blocking list, thereby blocking the wireless connection request of the WiFi mobile device and the other virtual access points.

To those skilled in the art, apparently the present invention is not limited to the details of the aforementioned exemplary embodiments; moreover, under the premise of not deviating from the spirit or fundamental characteristics of the invention, this invention can be accomplished in other specific forms. Therefore, the embodiments should be considered exemplary and non-restrictive no matter from which point, the scope of the invention is defined by the appended claims instead of the above description, and aims at covering the meanings of the equivalent components falling into the claims and all changes within the scope in this invention. Any reference sign in the claims shall not be deemed as limiting the concerned claims. Besides, apparently the word "comprise/include" does not exclude other components or steps, singular numbers does not exclude complex numbers, the plurality of components or means mentioned in device claims may also be accomplished by one component or means through software or hardware, the wording like first and second are only used to represent names rather than any specific order.

We claim:

1. A method for managing wireless connection of WiFi mobile devices in a connection controlling device, wherein the method comprises the following steps:
   a. obtaining one or more wireless connection requests from WiFi mobile devices, forwarded by an access point device, for virtual access points of the access point device, wherein the wireless connection requests include beacon information of the corresponding virtual access point;
   b. obtaining access-related information of the virtual access points based on the wireless connection request, wherein the access-related information includes signal strength information of the virtual access points with respect to the WiFi mobile devices;
   c. determining scheduling information corresponding to the wireless connection request based on the signal strength information of the access-related information, wherein the scheduling information includes a target virtual access point, of the virtual access points, corresponding to a first one of the WiFi mobile devices; and d. providing the scheduling information to the access point device.

2. The method according to claim 1, wherein the step b comprises:
the obtaining of the access-related information of the virtual access points based on the one or more wireless connection requests includes the access-related information having signal strength information and access ancillary information of the virtual access points with respect to the WiFi mobile devices.

3. The method according to claim 2, wherein the access ancillary information includes at least one of the following:
location information corresponding to the WiFi mobile devices and/or the access point device;
load-related information corresponding to the access point device and/or the virtual access points.

4. A method for managing subsidiarily wireless connection of WiFi mobile devices in an access point device, wherein the method comprises the following steps:
virtualizing physical resources on an access point device, to obtain a plurality of virtual access points that are independent one another;
broadcasting beacon information corresponding to the virtual access points within an area corresponding to the virtual access points;
wherein the method further comprises:
A. obtaining one or more wireless connection requests from the WiFi mobile devices for the plurality of virtual access points, wherein the wireless connection requests include beacon information of a corresponding virtual access point, of the plurality of virtual access points;
B. transmitting the one or more wireless connection requests to a corresponding connection controlling device;
C. obtaining scheduling information provided by the connection controlling device based on the one or more wireless connection requests, wherein the scheduling information includes a target virtual access point corresponding to a first one of the WiFi mobile devices, wherein the target virtual access point corresponding to the first one of the WiFi mobile devices is determined based on signal strength information of the target virtual access point with respect to the first one of the WiFi mobile devices, the signal strength information being associated with the one or more wireless connection requests;
D. establishing a wireless connection between the first one of the WiFi mobile devices and the target virtual access point.

5. The method according to claim 4, wherein the method further comprises:
obtaining scheduling information provided by the connection control device based on the one or more wireless connection requests, wherein the scheduling information includes other virtual access points corresponding to the WiFi mobile devices, other than the target virtual access point;
blocking wireless connection requests of the WiFi mobile devices and the other virtual access points based on the scheduling information.

6. The method according to claim 4, wherein the virtualizing of the physical resources includes,
virtualizing the physical resources on the access point device based on resource-related information of the access point device, to obtain a plurality of virtual access points that are independent of one another.

7. A connection controlling device for managing wireless connection of WiFi mobile devices, wherein the device comprises:
connection request obtaining apparatus for obtaining one or more wireless connection requests from WiFi mobile devices, forwarded by an access point device, for virtual access points of the access point device, wherein the wireless connection requests include beacon information of the corresponding virtual access point;
access information obtaining apparatus for obtaining access-related information of the virtual access points based on the one or more wireless connection requests, wherein the access-related information includes signal strength information of the virtual access points with respect to the WiFi mobile devices;
schedule determining apparatus for determining scheduling information corresponding to the one or more wireless connection requests based on the signal strength information of the access-related information, wherein the scheduling information includes a target virtual access point corresponding to a first one of the WiFi mobile devices in the one or more virtual access points; and
providing apparatus for providing the scheduling information to the access point device.

8. The connection controlling device according to claim 7, wherein the access information obtaining apparatus is configured to:
obtain the access-related information of the virtual access points based on the one or more wireless connection requests, wherein the access-related information includes signal strength information and access ancillary information of the virtual access points with respect to the WiFi mobile devices.

9. The connection controlling device according to claim 8, wherein the access ancillary information includes at least one of the following:
location information corresponding to the WiFi mobile devices and/or the access point device;
load-related information corresponding to the access point device and/or the target virtual access point.

10. An access point device for managing subsidiarily of wireless connection of WiFi mobile devices, wherein the device comprises:
virtualizing apparatus for virtualizing physical resources on an access point device, to obtain a plurality of virtual access points that are independent one another; broadcasting apparatus for broadcasting beacon information corresponding to the virtual access points within an area corresponding to the virtual access points;
wherein the device further comprises:
connection request receiving apparatus for obtaining one or more wireless connection requests from the WiFi mobile devices for the plurality of virtual access points, wherein the wireless connection request includes beacon information of a corresponding virtual access point;
connection request transmitting apparatus for transmitting the one or more wireless connection requests to a corresponding connection controlling device;
first scheduling obtaining apparatus for obtaining scheduling information provided by the connection controlling device based on the one or more wireless connection requests, wherein the scheduling information includes a target virtual access point, of the plurality of access points, corresponding to a first one of the WiFi mobile devices, wherein the target virtual access point corresponding to the first one of the WiFi mobile devices is determined based on signal strength information of the target virtual access point with respect to the first one of the WiFi mobile devices, the signal strength information being associated with the one or more wireless connections requests;

connection establishment apparatus for establishing a wireless connection between the first one of the WiFi mobile devices and the target virtual access point.

11. The access point device according to claim 10, wherein the device further comprises:

second scheduling obtaining apparatus for obtaining scheduling information provided by the connection controlling device based on the one or more wireless connection requests, wherein the scheduling information includes other virtual access points corresponding to the WiFi mobile devices, other than the target virtual access point;

request blocking apparatus for blocking wireless connection requests of the first one of the WiFi mobile devices and the other virtual access points based on the scheduling information.

12. The access point device according to claim 10, wherein the virtualizing apparatus is configured to:

virtualize physical resources on the access point device based on resource-related information of the access point device, to obtain a plurality of virtual access points that are independent of one another.

* * * * *